United States Patent [19]

Barr

[11] Patent Number: 4,518,066
[45] Date of Patent: May 21, 1985

[54] SAFETY PARKING BRAKE FOR AUTOMATIC TRANSMISSIONS

[76] Inventor: William A. Barr, Gibson Island, Md. 21056

[21] Appl. No.: 528,863

[22] Filed: Sep. 2, 1983

Related U.S. Application Data

[63] Continuation-in-part of Ser. No. 485,514, Apr. 15, 1983, abandoned.

[51] Int. Cl.³ .................... B60K 67/00; B60K 41/26
[52] U.S. Cl. ....................................... 192/4 C; 188/31
[58] Field of Search ................... 192/4 A, 4 C, 4 R; 188/69, 31, 72.2, 74; 74/577 S

[56] References Cited

U.S. PATENT DOCUMENTS

| | | | |
|---|---|---|---|
| 3,601,231 | 8/1971 | Kolacz | 192/4 A |
| 4,369,867 | 1/1983 | Lemieux | 192/4 A |
| 4,413,712 | 11/1983 | Richard | 192/4 A |

OTHER PUBLICATIONS

Automatic Transmission Park System Review, Ford Motor Company, Dec. 20, 1978.

*Primary Examiner*—George H. Krizmanich
*Attorney, Agent, or Firm*—Scrivener Clarke Scrivener and Johnson

[57] ABSTRACT

Sudden accidental or unintended movement of an automatic transmission into reverse with the engine running is prevented by substituting for the usual unitary control rod a two part arrangement, one being movable by the shift lever and the other being movable by a spring separator from the shift lever but arranged to exert a force only in the direction of a parking pawl and never in the reverse direction against any member connected to the detent plate. Thus it is impossible for a yielding cam spring to ever drive the linkage unexpectedly into reverse should a driver carelessly position a shaft lever between its reverse and park positions.

7 Claims, 7 Drawing Figures

SAFETY PARKING BRAKE FOR AUTOMATIC TRANSMISSIONS

This application is a continuation-in-part of application Ser. No. 485,514, filed Apr. 15, 1983 now abandoned.

This invention relates to automatic transmission for vehicles and more particularly to safety means for preventing a vehicle from moving suddenly from a stopped condition into reverse when the driver, with the engine running, accidently positions the shift lever intermediate its reverse and full park position.

BACKGROUND OF THE INVENTION

Vehicle automatic transmissions are controlled by a shift lever which operates, through a notched detent plate, a spool valve which for every drive position, including reverse, of the shift lever directs power to the vehicle wheels. For parking, the shift lever is moved from or past reverse to park position, to place the spool valve in a non drive position and operate a mechanical linkage system including some form of cam means for effecting movement of a pawl towards a toothed parking gear. Should the pawl first engage the surface of a tooth, as is the usual case, rather than the space between two teeth, yielding resilent means must be provided in the linkage to enable the shift lever to be moved to its full park position while the pawl is held out of its park position due to its engagement with a tooth. After the vehicle has drifted a short distance sufficient to align an inter-tooth space with the pawl, the resilient means acts to drive the pawl into its park position.

A recognized problem with the above described arrangement is that when a driver carelessly moves the shift lever to a position intermediate the reverse and park position and the engine is running, the resilient means can anchor on the pawl while it is temporarily hung up on a tooth surface and drive the system from a partial parked condition back to reverse causing the vehicle to suddenly move in reverse. Persons standing behind the vehicle can and have been seriously injured.

Efforts to combat the foregoing problem have involved the re-design of the gates or slots for the shift lever in the driver's compartment with the intention of inducing the driver to move the lever into its full park position. These efforts, however, have not been successful and accidents to person and property continue to occur.

In my co-pending applications Ser. No. 363,080 filed Mar. 29, 1982, and Ser. No. 485,513 filed Apr. 15, 1983 I disclose arrangements for combating the foregoing problem, not at the driver or shift lever end of the system but at the transmission end, the arrangements being such that as the linkage system is moved a predetermined distance towards park, means are provided for exerting a force on the system, first, to restrain it from moving towards reverse and, second, to urge the system towards the full park position so that even if the driver has been initially careless in positioning the shift lever in what he thought to be park, the system not only cannot move unexpectedly to reverse but it will be driven into the full park position as soon as the pawl aligns with a space between two teeth.

The object of the present invention is to provide an improved system for accomplishing similar results as in the foregoing applications but in which the resilient means, which normally yields when the pawl engages a tooth surface, is arranged to operate in only the direction of park and never in the direction of reverse.

More particularly, it is an object of the invention to provide a system of the foregoing nature wherein the resilient means is, for every position of the system except park, stressed away from park and when the system is moved in the direction of park, the stress exerts a force on the system tending to drive it towards park but never towards reverse.

The foregoing and other objects of the invention will become apparent as the following detailed description is read in conjunction with the accompanying drawings wherein.

Figure 1:
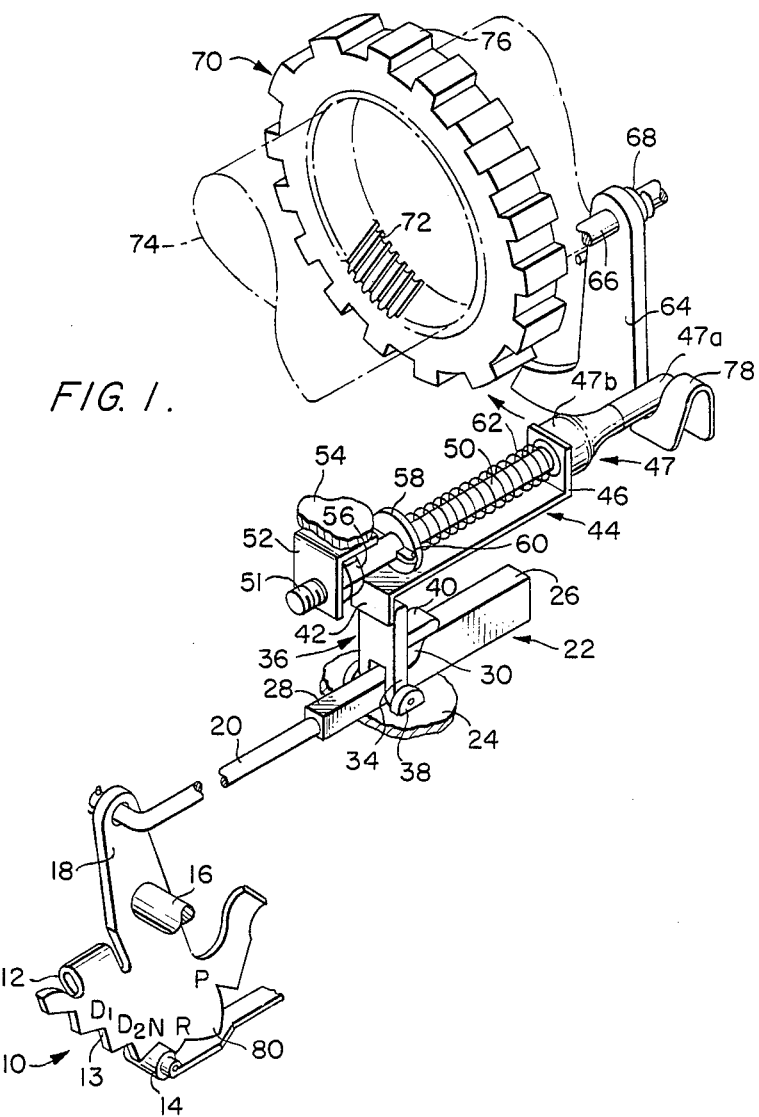
FIG. 1 is a schematic perspective view showing the salient features of one embodiment of the present invention.

Turning now to FIG. 1, there is shown there a typical detent plate 10 provided with a downturned arm 12 adapted to be connected to a spool valve (not shown) in a known manner. The plate 10 has notches 13 in its edge which may be marked $D_1$, $D_2$, N, R and P, standing for first drive, second drive, neutral, reverse and park, and which are engageable by a spring loaded detent 14. The detent plate is provided with a pivot shaft 16 connected through suitable linkages to the shift lever (not shown) in a known manner, and extending upwardly from one side of the pivot shaft 16 is an arm 18 which in conventional systems is designed to be connected to a control rod for operating a parking pawl through some form of cam means. In place of the conventional control rod, and in accordance with the invention, there is attached to the arm 18 one end of a rod 20 which may be screw threadedly or otherwise attached at its opposite end to an elongated block member 22 slidably supported on a portion 24 of the transmission housing. The block member has a first flat linear surface 26 and a second linear surface 28 joined by sloping cam-like surface or shoulder 30.

Straddling the block 22 is the bifurcated lower end 34 of a lever 36 which is pivoted on suitable brackets 38 to the housing portion 24. The lever 36 is provided with an integral slider arm 40 extending at right angles from one face of the lever and arranged to slidably engage the surfaces 26, 28, 30 of the sliding block 22. Bearing on the free end of the lever 36 is the downturned end 42 of an elongated, somewhat Z-shaped force transmitting member 44 whose opposite, up-turned end 46 is rigidly fixed on one side to a cone-shaped cam member 47 having an elongated reduced diameter nose portion 47a, and a large diameter portion 47b connected by a sloping cam surface 47c. The cam member 47 is slidable on one end of a rod 50 which extends through an aperture in the end 46 of the transmitting member 44. The opposite end 51 of the rod 50 is threaded and loosely received in an aperture through an arm of an L-shaped bracket 52 whose other arm is rigidly fixed to a part 54 of the transmission housing. A pair of nuts 56 are screwed onto the threaded end 51 of the rod to serve as stops for the rod with respect to the bracket 52.

Carried on the rod 50 is a washer 58 backed by a cross pin 60. Surrounding the rod 50 and interposed between the washer 58 and the end 46 of the force transmitting member 44 is a compression spring 62 which, in the position of the parts in FIGS. 1 and 2, exerts a force on the arm 46 of the force transmitting member 44 tending to move it and the cam member 47 in the direction of a parking pawl 64 pivotally mounted on a suitable shaft 66 and biased by suitable spring means such as the torsion spring 68 shown in the direction of the cam member 47 and, with the cam in the position of FIGS. 1 and 2, clear away from a parking gear 70 fixed in any suitable manner such as by splines 72 to an output shaft 74. The gear 70 is provided with a series of radial teeth 76 and, as is apparent, when the cone cam 47 is moved to the right it acts between a fixed saddle 78 and the rear edge of the pawl to drive it in opposition to the bias of spring 68 in the direction of the parking gear.

The operation of the embodiment of FIGS. 1, 2 and 3 will now be described. Assuming that the driver has moved the shift lever to the first drive position, the notch marked $D_1$ in the detent plate is aligned with the detent 14 and the sliding block 22 is positoned so that the sliding arm 40 of the lever 36 engages the flat or linear surface 26 of the sliding block. With the sliding arm thus engaged the lever 36 is moved counterclockwise in FIG. 1 (clockwise in FIG. 2) to a substantially vertical position where it exerts a force on the arm 42 of the force transmitting member 44 which is moved to the right as viewed in FIG. 2 so that the other arm 46 of the member 44 compresses the spring 62 between it and the washer 58. When the member 44 is thus moved, it drags with it the cone cam 47 so that only the reduced diameter nose part 47a engages the saddle 78 and, when in this position, the torsion spring 68 biases the pawl 64 into abutting slidable engagement with the cam nose part 47a wherein the nose part is entirely clear of the parking gear as can be seen in FIG. 1.

Figure 2:
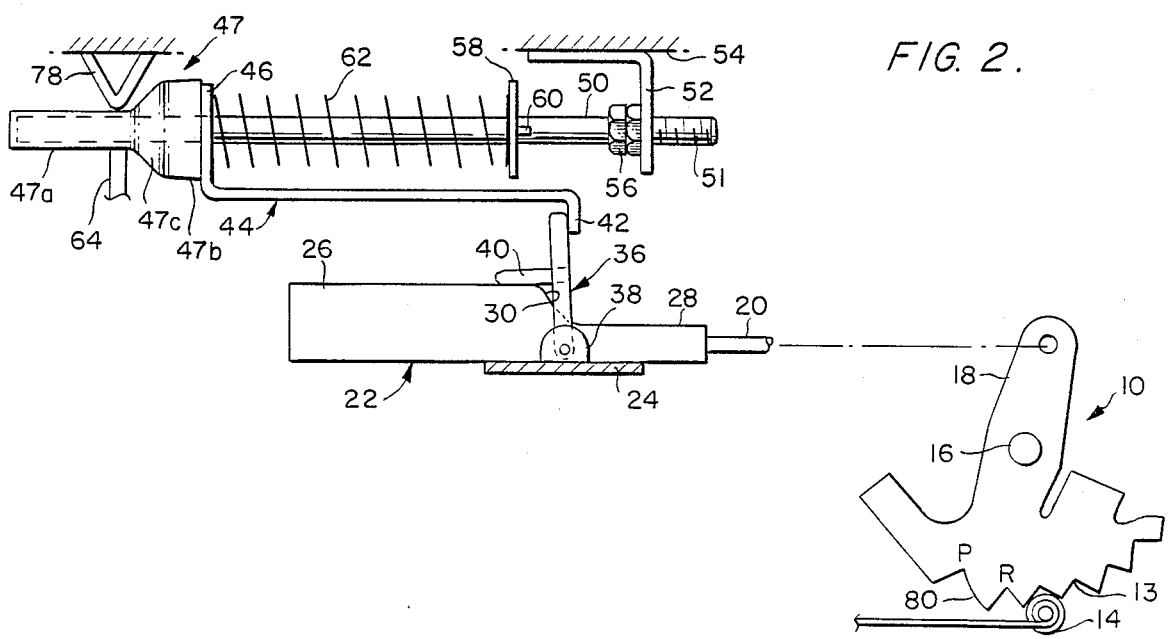
FIG. 2 is a schematic side elevational view of the embodiment of FIG. 1 showing the parts in a typical drive position.

The flat or linear surface 26 on the sliding block 22 has an axial extent such that for every position of the detent plate including reverse position, the lever arm 40 engages the surface 26 and all the parts of the linkage mechanism are retained in the position of FIGS. 1 and 2 except for the detent plate and sliding block which, of course, are moved depending on the selected position of the shift lever.

Should the driver wish to park the vehicle, he moves the shift lever towards park and in so doing he moves the detent plate first to its reverse position and then towards park. As the detent 14 moves over the end of the projection 80 between the reverse and park notches on the detent plate and starts to move along the face of the projection approaching the bottom of the park notch, the upper end of the cam surface 30 on the sliding block 22 comes into alignment with the sliding end of the lever arm 40 which starts down the surface 30 and immediately resists any tendency of the sliding block, and hence the detent plate, to move in a reverse direction. As the driver moves the shift lever further towards park, the arm 40 slides further down the cam face 30 and exerts a force on the face 30 due to the expansion of spring 62 to the left in FIG. 2 and which, as it expands, also moves the cam surface 47c of cone cam 47 between the saddle 78 and the pawl 64 to move it towards the parking gear, those skilled in this art recognizing that the strength of spring 62 is sufficiently greater than that of the pawl biasing spring 68 to permit this action. In the event that the pawl engages a tooth surface instead of the space between two teeth, the cam cannot move to its full extent to the left but the driver can still move the detent plate and block to their full park position and when able, the spring 62 drives the cam 47 to the position of FIG. 3 whereby the pawl is moved to its full park position between two teeth of the parking gear.

Assume now that the driver carelessly fails to move the shift lever to its full park position. The friction and tolerances in the linkage system can, in conventional systems, cause the detent 14 to hang up on that slope of the projection 80 leading towards the bottom of the park notch in the detent plate and, should the pawl in such a system engage the outer surface of a tooth rather than enter the space between two teeth on the parking gear spring means, such as a spring carried on a unitary control rod leading from the detent plate to a sliding cone cam on the rod, as in many parking linkages, can anchor on the cone or pawl and react in the opposite direction against the control rod to move the detent plate from its partial park position back to its reverse position and, should the engine be running, the vehicle will move unexpectedly in reverse causing possible injury or property damage.

The present invention prevents this occurrence simply because the spring 62 acts against a movable member in one direction only namely towards the pawl and can never react on an anchored pawl hung up on the surface of a tooth to exert a force on the detent plate tending to move it from a partial park position towards reverse position. Even if the spring should exert a force to the right in FIG. 2, the rod 50 cannot move to the right due to the stop nuts 56, but, even if the rod could so move, this would result merely in separation of the end 42 of the transmission member 44 from the lever 36 with no reverse force being applied to the sliding block or detent plate.

Figure 3:
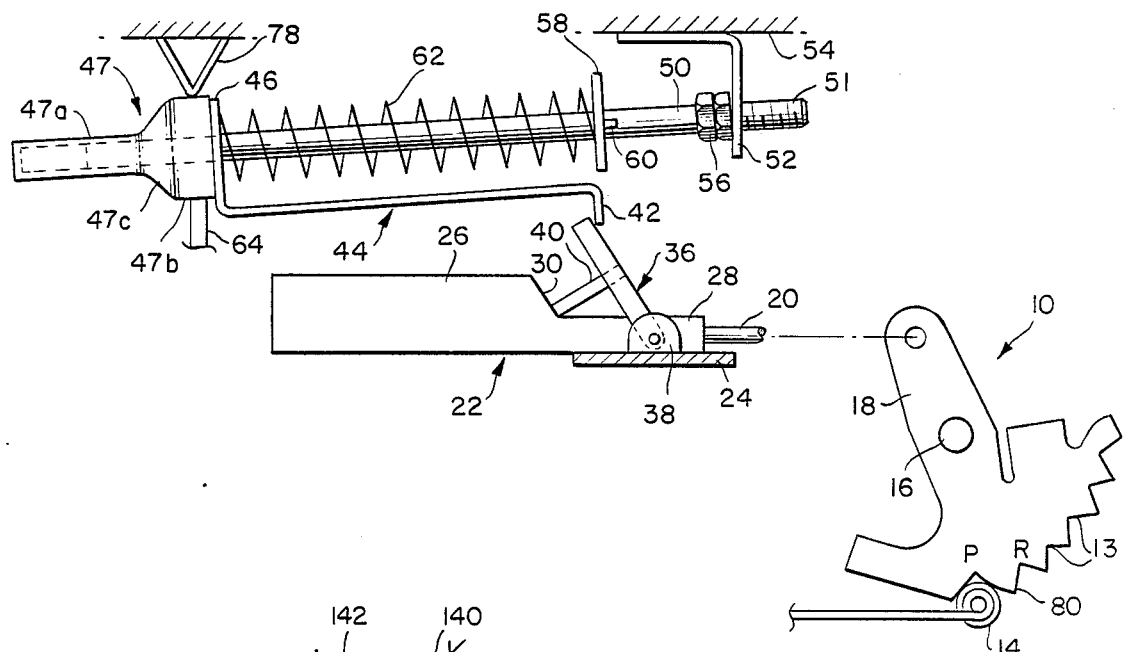
FIG. 3 is a view similar to FIG. 2 but showing the system in its full park position.

In accordance with the invention, however, if the driver should accidently position the shift lever between reverse and park as described above and the pawl hang up on the surface of a tooth, all spring forces act only towards the pawl, which as soon as the vehicle drifts a slight distance, snaps into an inter-tooth space and at the same time the force of spring 62 causes the arm 40 of the lever 36 to react on the cam surface 30 of the block 22 to drive the block and hence the detent plate into their full park positions of FIG. 3. In FIG. 3 it can be seen that in park, the large diameter portion 47b of the pawl cam engages the saddle 49 causing the rod 50 to tilt, which is readily accommodated due to the loose fit of the rod end 51 in the aperture 52. If desired, additional nuts can be threaded onto the end 51 of the rod on the side of the arm of bracket 52 opposite the nuts 56.

When the driver wishes to operate the vehicle from its parked condition, he merely moves the shift lever from park to any one of the drive or reverse positions, and substantially at the point where the detent traverses the peak of the projection 80 between the park and reverse notches, the arm 40 rides up onto the linear surface 26 of the block and as it does so the lever 36 retracts the force transmitting member 44 to withdraw the cone cam from the pawl sufficient to enable it to be moved fully clear of the parking gear. At the same time, the spring 62 is compressed and remains in this condition so long as the shift lever is in any of its positions except park.

Figure 4:
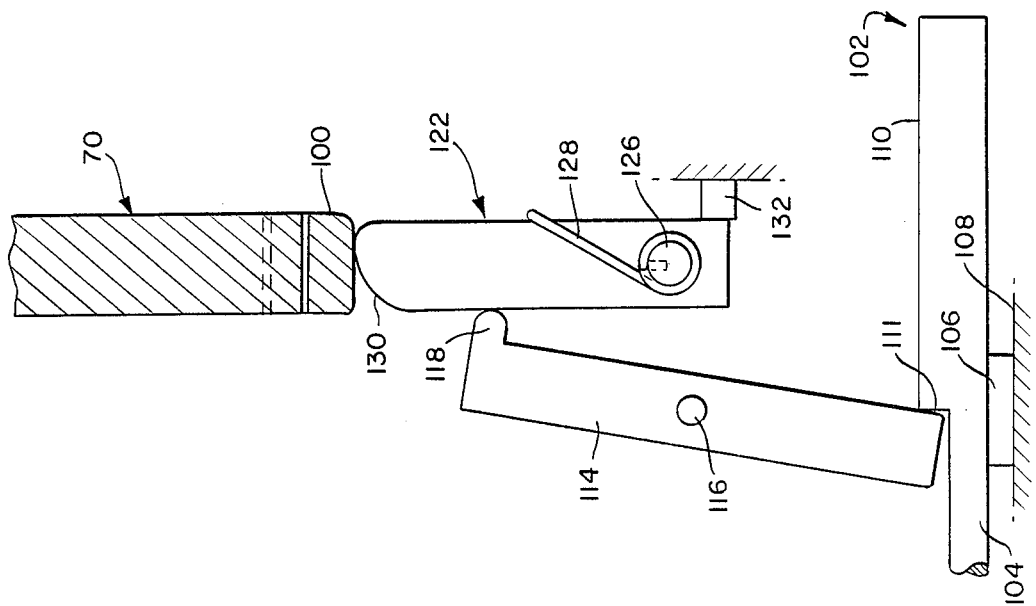
FIG. 4 is a schematic view of the salient features of a second embodiment of the present invention.
Figure 5:
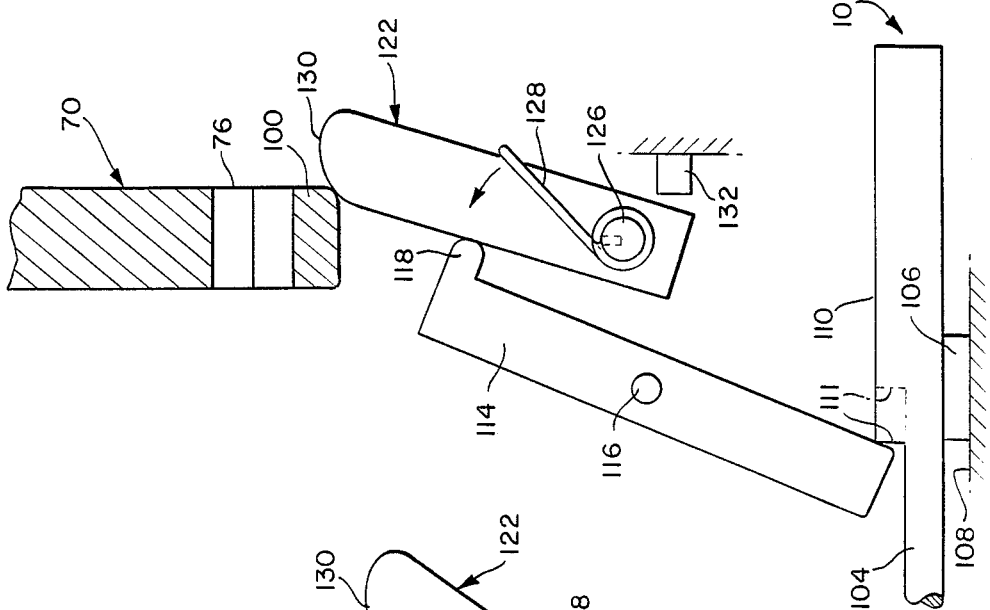
FIG. 5 is a view of the arrangement of FIG. 4 showing the elements of the invention following movement of the system a predetermined minimum distance towards park and with the pawl engaged with the surface of a tooth.
Figure 6:
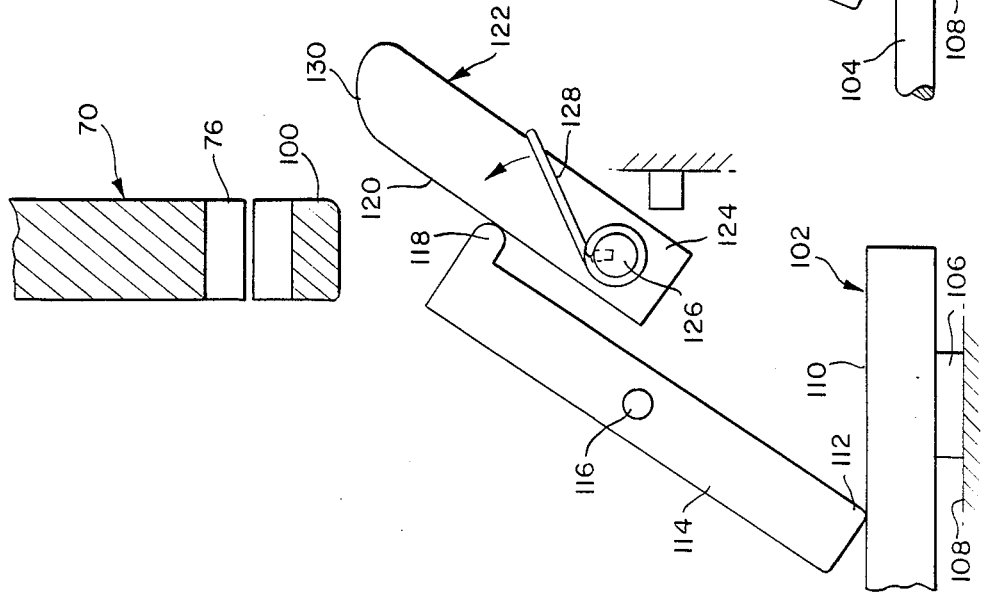
FIG. 6 is a view similar to FIG. 5 but showing the system in its full park position.

Referring now to the modification of FIGS. 4 through 6 where like numerals are applied to like parts of FIGS. 1 through 3, there is shown schematically a parking gear 70 having teeth 76 and a pawl 100 engageable between two teeth for parking but biased away from the parking gear. As in the first modification, there is a sliding block 102 connected by a rod part 104 to the detent plate (not shown). The block is slidably supported on a backing plate 106 fixed to the transmission housing 108 and has on its upper side a flat linear surface 110 ending at a shoulder 111 which serves substantially the same purposes as the cam surface 30 on the sliding block 22 of the modification of FIGS. 1 through 3. For all positions of the sliding block 102 except park, the surface 110 is slidably engaged by the rounded corner 112 of a lever 114 pivoted intermediate its ends on a shaft 116 to the transmission housing. The upper end of the lever is provided with a projection 118 slidably engaging the edge 120 of a cam member 122 pivoted at one end 124 to a shaft 126 secured to the transmission housing. Resilient means, such as the torsion spring 128 shown, at all times urges the cam member in the direction of the pawl 100 but, so long as the corner 112 of the lever 114 engages the surface 110 of the block, the camming surface 130 of the cam member 122 is retained clear of the pawl 100.

The operation of the modification of FIGS. 4 through 6 is similar to that of FIGS. 1 through 3. Briefly, for every drive position, including reverse, of the detent plate and slide block, the corner 112 of the lever 114 rides on the linear surface 110 of the slide block. As the detent plate is moved by the shift lever from or past reverse to park, at a predetermined minimum travel towards park, optimally just after the detent has passed over the peak of the projection between the reverse and park notches, the block is so positioned that the corner 112 drops over the shoulder 111 enabling the torsion spring to act on the cam member to move it until the cam surface 130 engages the pawl 100 and, at the same time, the lever 114 is driven counterclockwise to engage the shoulder 111. Should the driver have accidently stopped at this point moving the shaft lever towards park and should the pawl also have engaged the surface of a tooth, as in FIG. 2, it will be seen that any tendency for the detent plate to move back towards its reverse position, is resisted by engagement of the corner 112 of the lever 114 with the upper edge of the shoulder 111. Should the driver, however, move the shift lever into its full park positon, then the shoulder 111 will be moved away from the lever 114 as shown by the dotted lines in FIG. 2 until such time as the vehicle drifts slightly to align an inter-tooth space with the pawl whereupon it snaps into the full park position of FIG. 6, and the lower end of the cam engages a stop 132 conveniently located within the transmission housing.

As before, should movement towards park of the block 102 be stopped short of its full park position and the pawl hangs up on a tooth surface, as soon as the pawl aligns with an inter-tooth space the cam spring acts through the cam and lever 114 to cause the corner 112 of the latter to react against the shoulder and force the block and hence the detent plate into their full park position of FIG. 3.

In both embodiments of the invention, it will be observed that not only does the single cam spring effect movement of the cam into engagement with the pawl after the detent plate has been moved a predetermined minimum distance towards park, but the cam spring also serves both to restrain movement of the block and detent plate towards reverse when the pawl hangs up on the surface of a tooth and as well as effecting movement of the mechanism into full park position in the event the driver accidently moves the detent plate to some position intermediate full park and the minimum travel at which the shoulder 111 is moved just clear of the lower corner 112 of the lever 114.

Figure 7:
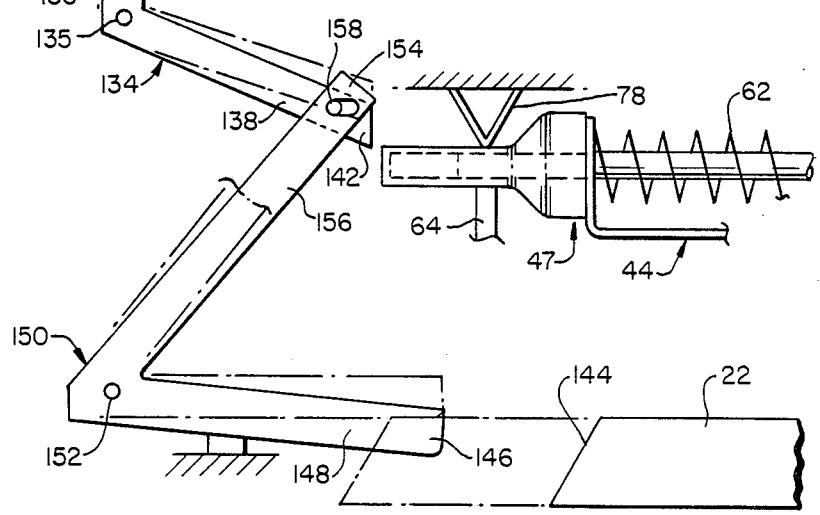
FIG. 7 is a somewhat schematic view of a safety stop means for preventing unintended movement of the parking cam and pawl into their park position.

It will be observed that in both the embodiments of FIG. 3 and of FIG. 4, should either the member 44 or the lever 114 become disengaged from the lever 36 or the surface 110 of the sliding block 102, respectively, the springs 62 or 128 could drive the parking cams into parking position while the respective driver operated means were in drive positions. Such disengagement could occur as a result of breaking of the respective member 44 or 114. In order to avoid this possibility safety stop means such as that disclosed in FIG. 7 can be provided. The stop means shown in FIG. 7 is exemplary only and comprises a lever 134 pivoted at 135 and having a pair of angularly related arms 136, 138. The arm 136 is urged against a stop 140 by a spring 142 and the arm 138 has at its free end a corner 142 which in the solid line position of the lever, normally extends into the path of movement of the parking cam 47 towards the pawl 64 and prevents the cam from engaging the pawl for every position of the driver operated means except park. To raise the corner clear of the pawl and permit the cam 47 to move to its park position, the forward face 144 of the elongated block member is sloped to define a cam surface engageable with the end 146 of one cam 148 of a bell-crank 150 pivoted to the transmission housing at 152. The end 154 of the other arm 156 of the bell-crank 150 is connected by a pin and slot arrangement 158 to the arm 138 of the lever 134, the arrangement being such that when the driver operated means is moved towards park, at the point where the lever 36 (FIG. 3) commences to engage the cam face 30, the second cam face 144 engages the end 146 of the bell-crank 150 causing it to rotate counter clockwise in FIG. 7 to its dotted line position thereby raising through the pin and slot connection 158 the corner 142 of arm 138 clear of the cam 47 so that it can operate in a normal manner exactly as if the safety stop means were not present. It will by apparent to those skilled in the art that the bell-crank arm 156 can be suitably slotted to permit the pawl to move freely to its full park position without interference from the arm part of the safety stop means. It will be understood that except when the driver deliberately moves the shift lever towards park, the safety stop means is in the path of movement of the pawl towards park so that, should the member 44 break, for example, and the spring 62 be thus released to expand against the cam 47, the latter engages the stop and cannot operate on the pawl to move it towards its park position.

The arrangement above described for use with the modification of FIGS. 1-3 of the invention, can be suitably adapted for use with the embodiment of FIGS. 4-6.

Having now described two embodiments of the invention, it will be apparent that it is susceptible of a variety of changes and modifications, without, however, departing from the scope and spirit of the appended claims.

What is claimed:

1. In a vehicle automatic transmission of the type having a parking gear fixed to an output shaft, a pawl movable between a first position clear of said gear and a second position wherein said pawl engages said gear for parking said vehicle, means biasing said pawl to its first position, cam means for controlling the movement of said pawl between its first and second positions, and driver operated means movable between a plurality of drive including reverse positions and a park position, said reverse and park positions being adjacent to each other, the invention comprising resilient means at all times urging said cam means towards said pawl, means responsive to the movement of said driver operated means to every position except park for exerting a force on said cam means in opposition to said resilient means to stress the same and retain said cam means clear of said pawl, and means responsive to movement of said driver operated means a predetermined minimum distance towards park position to relieve said stress on said resilient means and enable it to drive said cam means against said pawl to move the same from its first towards its second position.

2. In the automatic transmission of claim 1, including means for effecting a connection between said cam means and said driver operated means when the latter is moved said predetermined minimum distance towards park position for preventing said stressed resilient means from operating against said driver operated means to drive it back towards its reverse position.

3. In the automatic transmission of claim 2, wherein said means for effecting a connection between said cam means and said driver operated means includes means responsive to the relief of stress on said resilient means for driving said driver operated means to its full park position in the event said driver operated means is accidently positioned between said predetermined minimum distance and its full park position 4. In the automatic transmission of claim 1, wherein said driver operated means includes a linearly movable element having a linear surface thereon, a lever member pivoted with respect to said element and having a part slidably engaging said linear surface for every position of said drive operated means except park, said lever member having an operative connection with said cam means such that the resilient means urging said cam means towards said pawl simultaneously urges said lever part into sliding engagement with the linear surface of said linearly movable member, and a cam surface on said linearly movable member initially engageable by said lever end when said driver operated means is moved said predetermined distance towards park, said cam surface being arranged with respect to said lever end that when engaged by lever end said linearly movable member and hence said driver operated means is restrained from moving towards the reverse position 5. In the automatic transmission of claim 4, wherein said cam surface is of a shape and an extent that as the stress on said resilient means is relieved said lever end is driven on said cam surface to effect movement of said driver operated means to its full park position when said cam means moves said pawl into a park positon with respect to said parking gear.

6. In the automatic transmission of claim 1, including movable safety stop means normally in the path of movement of said cam means towards said pawl and positioned to prevent said cam means from engaging said pawl, and means responsive to said movement of said driver operated means said predetermined distance towards park position for moving said safety stop means clear of said cam means.

7. In the automatic transmission of claim 4, including movable safety stop means normally in the path of movement of said cam means towards said pawl and positioned to prevent said cam means from engaging said pawl, said lineraly movable member having an additional camming surface thereon, and lever means operatively connected to said movable stop means and engageable by said additional camming means when said driver operator means is moved towards park to move said safety stop means out of the path of movement of said cam means toward said pawl.

* * * * *